Sept. 22, 1931. G. P. LUNT 1,824,558
CHLORINATION OF ORGANIC COMPOUNDS
Filed April 14, 1927
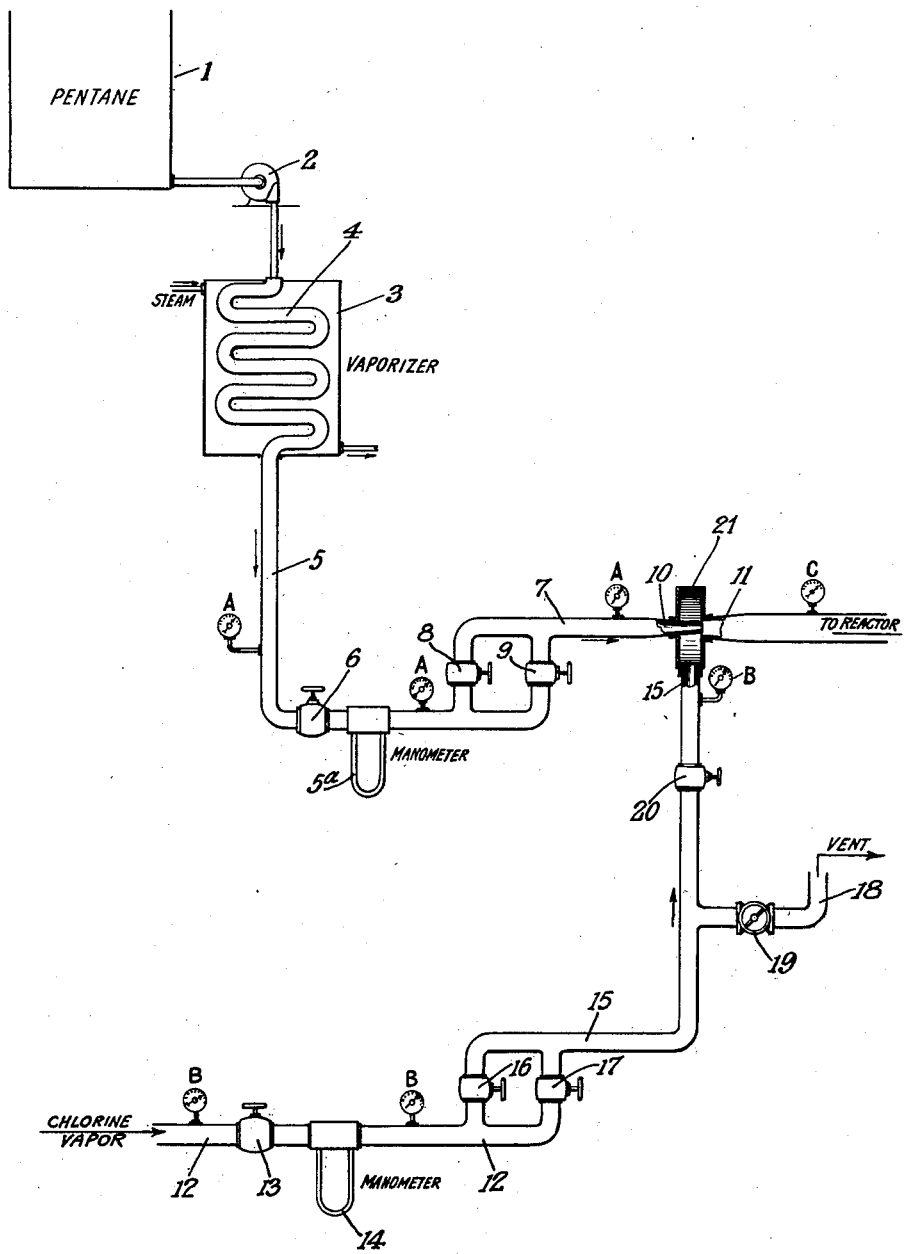

Patented Sept. 22, 1931

1,824,558

UNITED STATES PATENT OFFICE

GEORGE P. LUNT, OF BOSTON, MASSACHUSETTS, ASSIGNOR TO E. B. BADGER & SONS COMPANY, OF BOSTON, MASSACHUSETTS, A CORPORATION OF MASSACHUSETTS

CHLORINATION OF ORGANIC COMPOUNDS

Application filed April 14, 1927. Serial No. 183,666.

My invention relates to chlorination of substances in their vapor phase and it relates to effecting such chlorination without the danger of explosion and ignition, particularly explosion and ignition due to conditions existing or arising in the bringing together of the chlorine and the substance to be chlorinated preparatory to reacting those substances together to effect the desired chlorination. My invention relates to the chlorination in vapor phase of substances that are in liquid phase prior to chlorination and are vaporized by heat or release of pressure in preparation for chlorination, and also to chlorination in vapor phase of substances that exist in, or are maintained in, vapor phase prior to chlorination.

In the chlorination of substances in vapor phase there is great danger of explosion and a number of different conditions determine the likelihood of such an explosion. The action of light and the action of heat may cause an explosion of such mixtures; and sufficiently high pressure at even relatively low temperatures may cause an explosion. Furthermore, while the presence of a large excess of the substance to be chlorinated will render the mixture less explosive, the ignition of such a mixture will cause explosion, even though the mixture is maintained under temperatures and pressures at which it would otherwise be unlikely to explode. Moreover, a mixture of certain proportions may be safely handled under given pressure and temperature conditions, but accidental variations in the proportions may cause ignition or explosion, or both. While the final mixture may not be explosive under the existing temperatures and pressures, it is important to prevent ignition and explosion during the mixing of the chlorine and the substance to be chlorinated because at that time mixtures of all proportions exist until the mixing of the vapors is accomplished. It has been proposed to prevent ignition at the point at which chlorine is brought together with the vapor of the substance to be chlorinated, by maintaining such vapor in motion at a sufficiently high velocity with respect to such junction point, preferably at a velocity that will produce turbulent flow; and it is important that such velocity shall certainly be maintained. In the chlorination of substances in vapor phase the vapor of the substance and the chlorine vapor are brought together and thereafter subjected to the influence of heat or light as the agency for the promotion of the chlorinating reaction but reaction is likely to occur to some extent before the mixture is brought into the influence of the reacting agency and undesirable higher chlorides may be produced from the products of such premature reaction. It is therefore desirable that the mixture shall come promptly into the influence of the reacting agency after the chlorine is brought together with the substance to be chlorinated.

It is an object of my invention to provide a method for the chlorination of substances in vapor phase whereby the desirable procedure above described will be accomplished and whereby the undesirable effects above referred to will be avoided.

I have found that the dangers of chlorination and the occurrence of undesirable conditions in the chlorination of substances are minimized and that desirable conditions are attained by maintaining or forming the vapor of the substance to be chlorinated and the chlorine vapors separately at pressures respectively higher than the pressure at the point at which the vapors of the substance and of chlorine are brought together and higher than the pressure of resulting mixture while it is subsequently being subjected to the reacting influence of heat or light, and then releasing the vapor of the substance and the chlorine vapor into the mixing chamber from which they flow to the reactor.

When the vapor of the substance to be chlorinated and the chlorine vapor are handled in accordance with my invention such control of the vapors may be maintained that accidental formation of undesired mixtures can be substantially avoided in spite of interruption or irregularity in the supply of the vapors, and the vapors may be maintained in motion at such velocity as to prevent ignition and consequent explosion, and the likelihood of chlorine vapor backing up into the passages for the vapors of the substance to be chlorinated, and vice versa, is eliminated, and the prompt introduction of the mixture into the influence of the reacting agency is accomplished with the consequent avoidance of undesirable higher chlorides, and chlorination operations which have been dangerous even under laboratory conditions are now carried on upon a commercial scale.

In the chlorination of substances in accordance with my invention, the chlorine vapor and the vapor of the substance to be chlorinated are produced or maintained at pressures respectively above the pressure at the point where the vapors are brought together and above the pressure at which the chlorinating reaction is carried out.

The delivery of each vapor to the junction or mixing point may be carried out by effecting a series of successive reductions of pressure, as by passing the vapors successively through a series of valves, or the reduction of pressure may be effected by valves arranged in parallel and permitting close adjustment of vapor flow, or reduction of pressure of each vapor may be effected by a single valve. If the substance to be chlorinated is vaporized before it is mixed with the chlorine, as in the chlorination of pentanes, the substance will be fed to the vaporizer in such quantities and at such pressures that an effective pressure differential will be maintained between the vapor supply and the junction point. Similar practice will be followed in connection with chlorine supplied in liquid form. In chlorination, in accordance with my invention, a reduction of pressure of each vapor as it passes to the junction point of the vapors will probably cause a reduction in the temperature of the vapors, but it will result in bringing the vapors to a state in which their temperature is above the saturation point of the vapor at the existing pressure and the vapors may be superheated at the junction point. This ensures that no chlorine and none of the substance to be chlorinated will be in liquid phase at the junction point.

While chlorination in accordance with my invention may superficially appear to be an operation of simplicity, my invention has contributed largely to the commercial practice of chlorination which has heretofore been unsafe. For example, in chlorination in accordance with my invention, the chlorination of the pentanes may safely be carried out when the vaporized pentanes and chlorine are maintained at about 60 pounds gauge pressure and introduced into a chamber where the gauge pressure is about 40 pounds. In such a case the pentane is advantageously vaporized at about 75 pounds gauge pressure, and the vapor of pentanes and chlorine vapor are advantageously brought together in the proportion of 15 to 20 parts of vapor of pentanes to one part of chlorine vapor.

To assist in the understanding of my invention I have shown diagrammatically in the single figure of the drawing, apparatus whereby my invention may be practised in the chlorination of pentanes but it is to be understood that my invention is not limited to the chlorination of the pentanes and it is further understood that within the spirit of my invention various changes may be made in the apparatus employed, regardless of whether such changes are made to better adapt the apparatus for the chlorination of pentane or to adapt it to the chlorination of other substances.

Referring to the apparatus shown in the drawing, pentane or a mixture of pentanes is passed from tank 1 by pump 2 to vaporizer 3 in which the pentanes pass through a vaporizing coil 4 that is surrounded by a casing to which steam is supplied. The pipe 5 for vapors of pentane may include a valve 6 and be provided with a manometer 5a. The pipe 5 may be connected to pipe 7 by parallel valves 8 and 9. With such an arrangement of valves the pressure of the vapor of pentanes may be gradually stepped down and carefully controlled. Vapors of pentanes are preferably discharged from pipe 7 into a converging nozzle 10 from which they are discharged into a diverging throat 11 which comprises a mixing zone for the chlorine and pentane vapors. Chlorine vapor is introduced into pipe 12, which preferably includes a valve 13 and a manometer 14. The chlorine vapor pipe 12 may be connected to the chlorine vapor pipe 15 by parallel valves 16 and 17. The chlorine vapor pipe 15 is provided with a vent 18 having a valve 19 and is provided with a valve 20 in order to test the flow of chlorine prior to opening the valve 20 whereby the chlorine is released into the mixing zone. The mixture of chlorine vapor and vapor of pentanes is passed from the mixing zone to the reactor in which it comes under the influence of a reacting agency. In the operation of the apparatus the stepping down of the pressure of the vapor of pentanes is indicated by gauges A and the stepping down of the pressure of the chlorine vapor is indicated by gauges B; and the pressure of the chlorine vapor and vapors of pentanes would always be maintained higher than the pressure in the mixing zone which is indicated by gauge C.

In the operation of the apparatus described the convergence of the passageway 10 taken in connection with the divergence of the passageway 11 provides a throat through which hydrocarbon vapors may be passed at such velocity as to produce turbulent flow, and chlorine will pass into the hydrocarbon vapors at that point, as from the chamber 21.

What I claim and desire to secure by Letters Patent of the United States is:

1. In the chlorination in vapor phase of hydrocarbons that react with chlorine at a low velocity at the temperature at which the hydrocarbon is in vapor form, the steps for bringing together the hydrocarbon vapor and chlorine gas in one zone to form a mixture thereof without ignition or explosion preparatory to passing that mixture to the influence of a reacting agent in another zone, said steps comprising maintaining the hydrocarbon in vapor form under pressure, releasing the vaporized hydrocarbon into a zone of lower pressure, introducing chlorine into the vapor at such lower pressure, and passing the resulting mixture to the influence of a reacting agent in another zone.

2. In the chlorination in vapor phase of hydrocarbons that react with chlorine at a low velocity at the temperature at which the hydrocarbon is in vapor form, the steps for bringing together the hydrocarbon vapor and chlorine gas in one zone to form a mixture thereof without ignition or explosion preparatory to passing that mixture to the influence of a reacting agent in another zone, said steps comprising maintaining the hydrocarbon and the chlorine separately in vapor form under pressure, and then bringing the chlorine vapor and vaporized hydrocarbon into contact by releasing said vapors into a passage leading to the zone of influence of a reacting agent and wherein a substantially lower pressure is maintained.

3. In the chlorination in vapor phase of hydrocarbons that react with chlorine at a low velocity at the temperature at which the hydrocarbon is in vapor form, the steps for bringing together the hydrocarbon vapor and chlorine gas in one zone to form a mixture thereof without ignition or explosion preparatory to passing that mixture to the influence of a reacting agent in another zone, said steps comprising maintaining the hydrocarbon in vapor phase at such pressure, greater than the pressure in a chamber into which the chlorine and hydrocarbon are separately introduced, as will cause the vapors to be superheated after they are released into said chamber, and then passing the chlorine and hydrocarbon separately into said chamber to produce a mixture thereof that is passed to the influence of a reacting agent without ignition or explosion.

4. In the chlorination in vapor phase of hydrocarbons that react with chlorine at a low velocity at the temperature at which the hydrocarbon is in vapor form, the steps for bringing together the hydrocarbon vapor and chlorine gas in one zone to form a mixture thereof without ignition or explosion preparatory to passing that mixture to the influence of a reacting agent in another zone, said steps comprising maintaining the hydrocarbon and chlorine separately in vapor phase under such pressures, greater than the pressure in the chamber into which the chlorine and hydrocarbon are separately introduced, as will cause the vapors to be superheated after their release into said chamber, and then passing the chlorine and hydrocarbon vapors separately into said chamber to produce a mixture thereof that is passed to the influence of a reacting agent without ignition or explosion.

5. In the chlorination in vapor phase of hydrocarbons that react with chlorine at a low velocity at the temperature at which the hydrocarbon is in vapor form, the steps for bringing together the hydrocarbon vapor and chlorine gas in one zone to form a mixture thereof without ignition or explosion preparatory to passing that mixture to the influence of a reacting agent in another zone, said steps comprising maintaining the hydrocarbon in vapor form at a pressure not less than ten pounds per square inch greater that the pressure at the point where the hydrocarbon vapor and chlorine vapor are brought together, then bringing said vapors together by releasing them into a zone wherein such lower pressure is maintained, and passing the mixture without ignition or explosion into the influence of a reacting agency.

6. In the chlorination in vapor phase of hydrocarbons that react with chlorine at a low velocity at the temperature at which the hydrocarbon is in vapor form, the steps for bringing together the hydrocarbon vapor and chlorine gas in one zone to form a mixture thereof without ignition or explosion preparatory to passing that mixture to the influence of a reacting agent in another zone, said steps comprising maintaining the hydrocarbon and chlorine separately in vapor form respectively at pressures not less than ten pounds per square inch greater than the pressure at the point where the hydrocarbon vapor and chlorine vapor are brought together, then bringing said vapors together by releasing them into a zone wherein such lower pressure is maintained, and passing the mixture into the influence of a reacting agency.

7. The process steps claimed in claim 2, and in which pentane is the hydrocarbon chlorinated.

8. In the chlorination of pentane, the step comprising passing chlorine vapor into pentane vapor that is slightly superheated.

9. In the chlorination of hydrocarbons, the steps comprising flowing the vapor of the hydrocarbon and chlorine vapor together from separate sources respectively under substantially higher pressure than the zone in which the vapors come together, and passing the resulting mixture without ignition or explosion from the zone in which the mixture is formed to a separate zone wherein the mixture is subjected to the influence of a reacting agency.

10. In the chlorination in vapor phase of hydrocarbons that react with chlorine at a low velocity at the temperature at which the hydrocarbon is in vapor form, the steps comprising maintaining the hydrocarbon in vapor form under pressure, releasing the hydrocarbon vapor into a passage leading to the zone of the influence of a reacting agent and in which the pressure is sufficiently below that at which said vapor is maintained, to cause turbulent flow of said vapor, and introducing chlorine vapor into the hydrocarbon vapor while it is in turbulent flow.

11. In chlorinating apparatus, means for maintaining under substantially uniform pressure a supply of vapor, a substantially clear passage leading to the zone of influence of a reacting agent, means for passing vapor from said supply means to said passage with reduction of pressure, and a chlorine conduit opening into said passage.

12. In chlorinating apparatus, means for maintaining separately under substantially uniform pressure a supply of vapor of a substance to be chlorinated and a supply of chlorine vapor, a substantially clear passage leading to the zone of influence of a reacting agent, means for passing into said passage with reduction of pressure vapor of the substance to be chlorinated, and means for passing chlorine vapor into said passage with reduction of pressure and into contact with the vapor flowing therein.

13. In chlorinating apparatus, means for maintaining under pressure a supply of vapor of a substance to be chlorinated, a passage leading to the zone of influence of a reacting agent and having at some point a cross-sectional area sufficiently small that vapors passed therethrough will pass at a velocity causing turbulent flow, means for releasing said vapor into said passage with reduction of pressure, and a chlorine vapor conduit leading into said passage at a point of turbulent flow therein.

14. In chlorinating apparatus, a passageway leading to the zone of influence of a reacting agent and provided with a throat having a cross-sectional area sufficiently small to cause turbulent flow therethrough, means for releasing in said passageway with reduction of pressure vapor of a substance to be chlorinated, and means for introducing chlorine vapor into said passageway adjacent said throat.

15. In chlorinating apparatus, means for maintaining under pressure a supply of vapor of a substance to be chlorinated, a passageway having an outlet leading to the zone of influence of a reacting agent and having an inlet adapted to receive vapor from said source of supply and said passageway having between said inlet and said outlet a portion having a cross-sectional area which is sufficiently small that vapors passed through said portion will move at such high velocity as will prevent persistence of ignition upon introduction of chlorine into contact therewith, and means for introducing chlorine vapor into said passageway at a point at which said vapors are moving at such high velocity therein.

In testimony whereof, I have signed my name to this specification.

GEORGE P. LUNT.